(12) United States Patent
DeMars et al.

(10) Patent No.: US 6,186,055 B1
(45) Date of Patent: Feb. 13, 2001

(54) TURNTABLE COOKING AND SERVING APPLIANCE

(76) Inventors: Robert A. DeMars, 23221 Ladrillo Ave., Woodland Hills, CA (US) 91367; Patrick R. Pagett, 4663 Pine Valley Pl., Westlake Village, CA (US) 91362

( * ) Notice: Under 35 U.S.C. 154(b), the term of this patent shall be extended for 0 days.

(21) Appl. No.: 09/583,047

(22) Filed: May 30, 2000

(51) Int. Cl.[7] ............... A23L 1/00; A47J 37/00; A47J 36/26; A47J 39/02; H05B 1/00
(52) U.S. Cl. ............... 99/340; 99/427; 99/448; 99/483; 219/214; 219/218
(58) Field of Search ............... 99/331, 339, 340, 99/400, 401, 426, 427, 446–450, 483; 108/94, 95; 126/43, 275 R; 211/77, 78; 219/201, 214, 218, 464, 467.1, 518, 433, 521, 457.1

(56) References Cited

U.S. PATENT DOCUMENTS

| | | | |
|---|---|---|---|
| D. 176,097 | 11/1955 | Bonistall | D44/10 |
| D. 176,099 | 11/1955 | Bonistall | D44/10 |
| D. 215,870 | 11/1969 | Singer | D44/15 |
| D. 217,733 | 6/1970 | Singer | D44/15 |
| 2,719,413 | 10/1955 | Panzer | 65/55 |
| 3,213,849 * | 10/1965 | Hirsch | 126/43 |
| 3,535,299 | 10/1970 | Stewart, Jr. | 219/201 |
| 3,636,299 * | 1/1972 | Stewart, Jr. | 108/94 X |
| 3,851,599 * | 12/1974 | Bridges | 108/25 |
| 3,972,419 * | 8/1976 | Short | 211/78 |
| 4,034,200 | 7/1977 | Visagie | 219/218 |
| 4,243,013 * | 1/1981 | Goon et al. | 126/43 |
| 4,433,885 * | 2/1984 | Baker | 312/305 |
| 4,494,720 * | 1/1985 | Gregory et al. | 248/371 |
| 4,747,352 * | 5/1988 | Guidry et al. | 108/50 |
| 5,077,460 * | 12/1991 | Rocha et al. | 219/218 X |
| 5,189,282 * | 2/1993 | Rocha et al. | 219/467 |
| 5,203,255 * | 4/1993 | Wells et al. | 99/483 |
| 5,290,997 | 3/1994 | Lai et al. | 219/218 |
| 5,421,271 * | 6/1995 | Sui | 108/50 |
| 5,431,091 * | 7/1995 | Couture | 99/448 X |
| 5,784,952 | 7/1998 | Liu | 99/483 |
| 5,894,943 | 4/1999 | Liu | 211/78 |

* cited by examiner

Primary Examiner—Timothy F. Simone
(74) Attorney, Agent, or Firm—Jack C. Munro

(57) ABSTRACT

A turntable cooking and serving appliance which utilizes a substantially planer base within which is centrally mounted a pan. The pan includes an electrically operated heating element. A cooking vessel is to be removably locatable within the pan. An annular compartment surrounds the pan. A ring is mounted within the annular compartment with a bearing assembly being located between the ring and the floor of the annular compartment. A plurality of trays are locatable within the annular compartment and are adapted to rest on the ring and to be rotatable therewith. Each tray is to contain food with food also to be cooked within the cooking vessel.

17 Claims, 5 Drawing Sheets

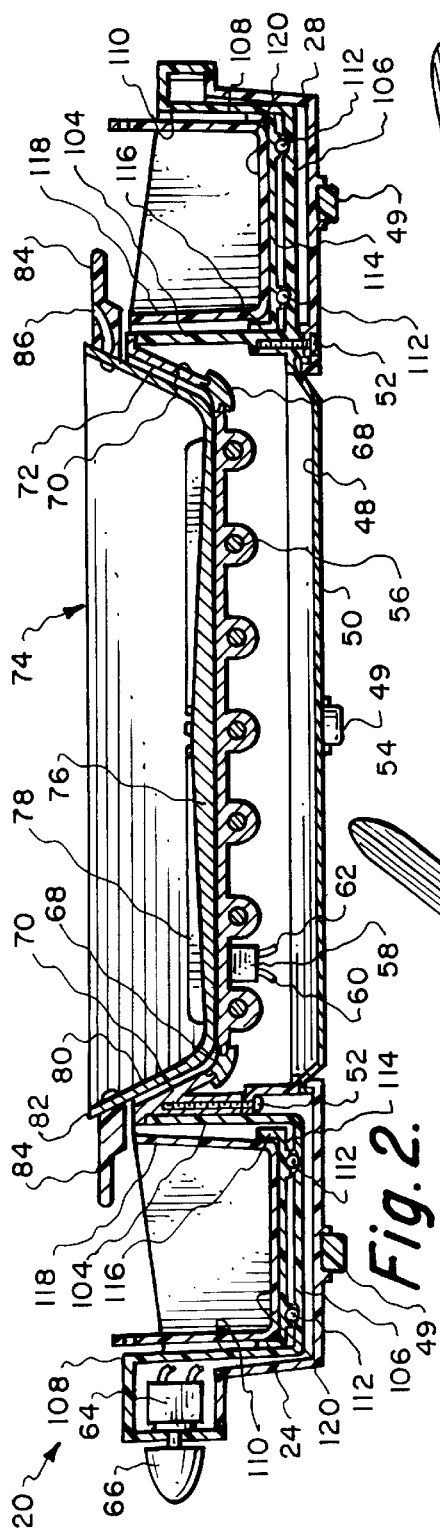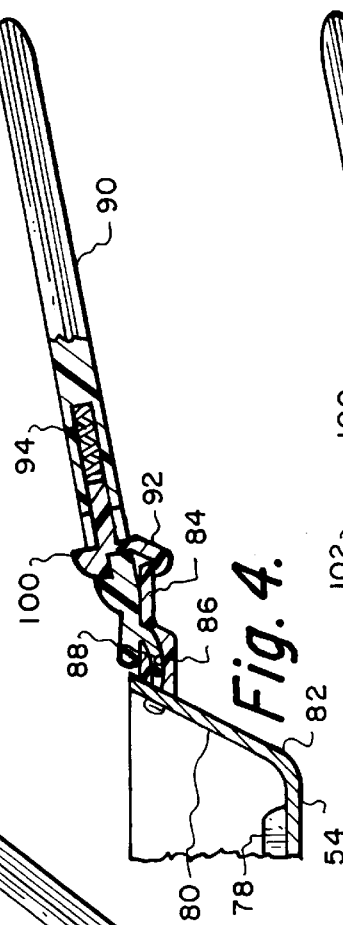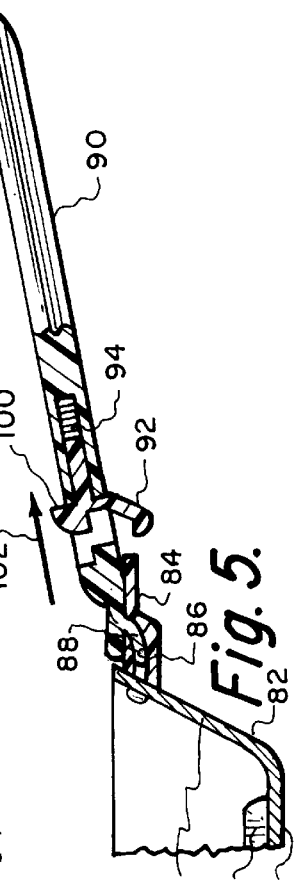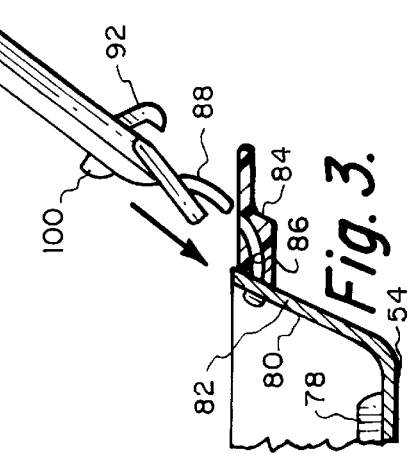

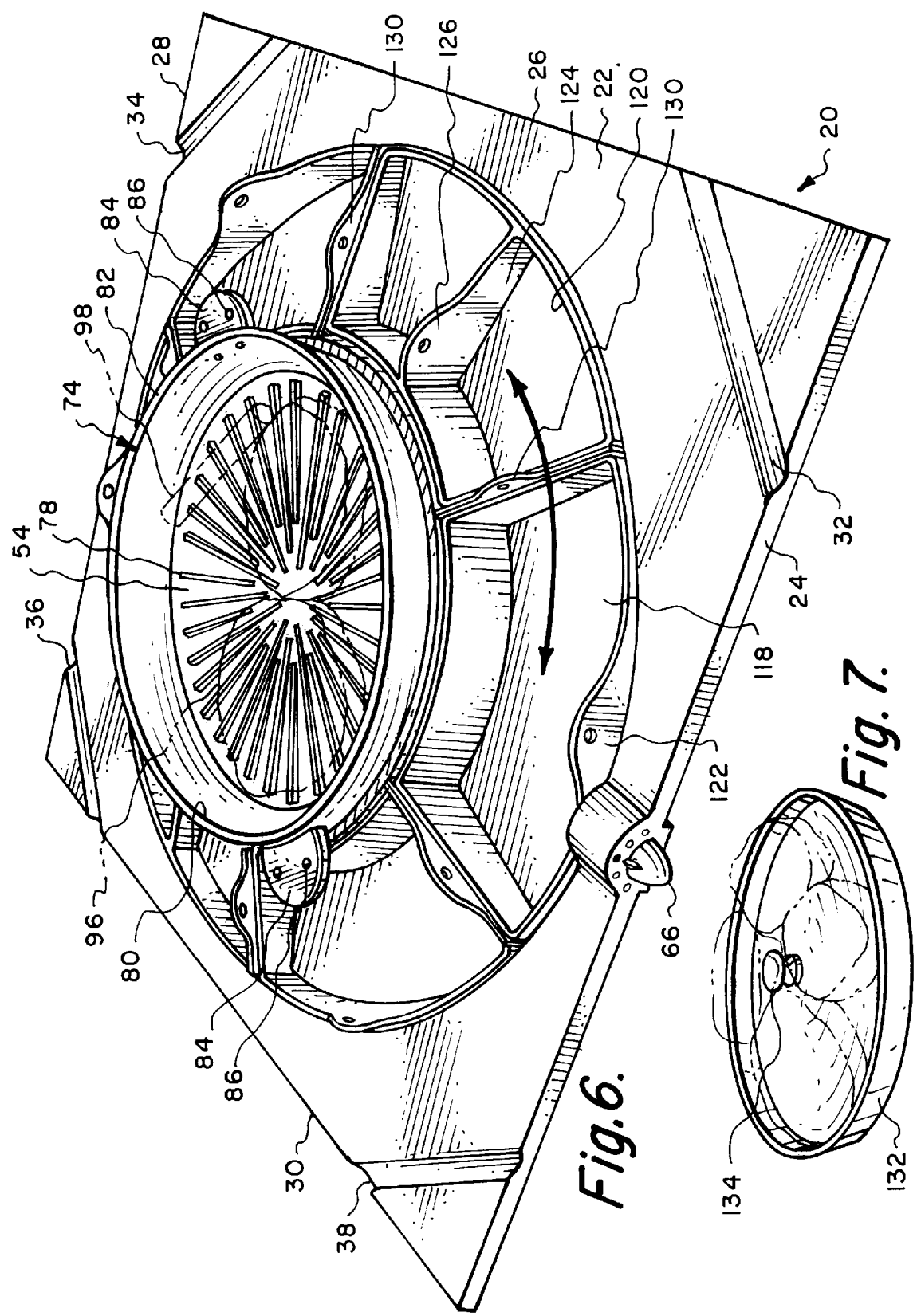

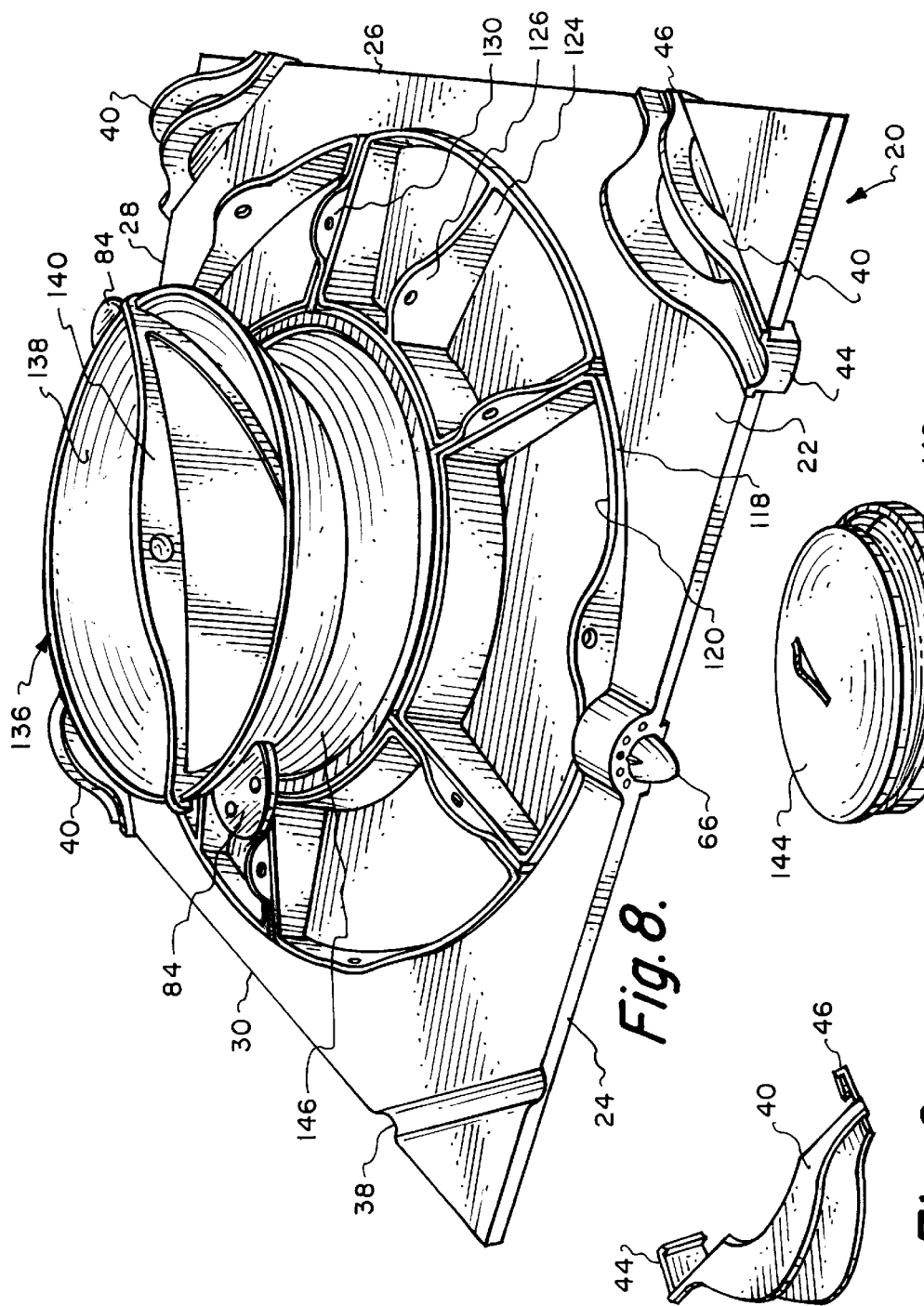

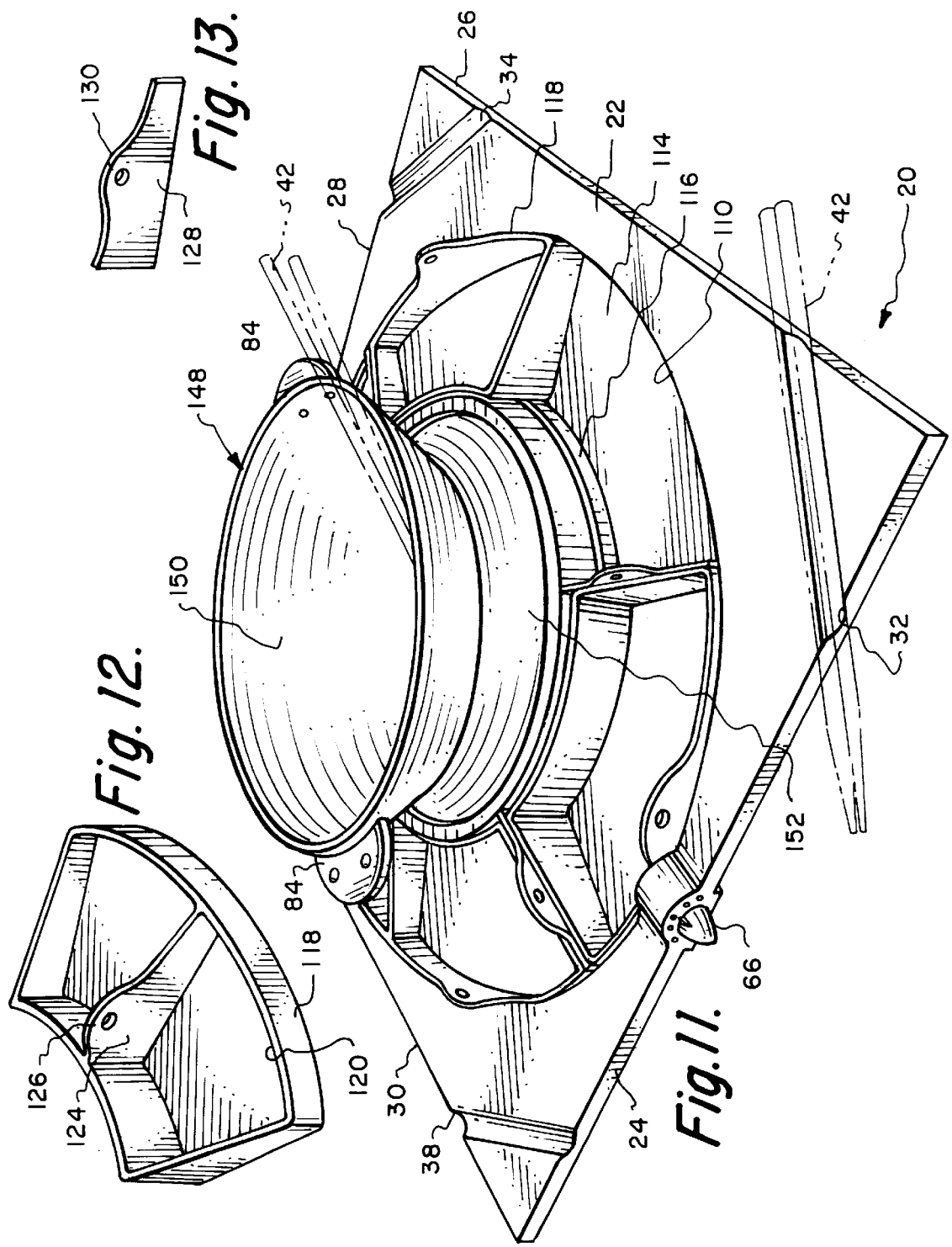

TURNTABLE COOKING AND SERVING APPLIANCE

BACKGROUND OF THE INVENTION

1) Field of the Invention

The field of this invention relates to a heatable turntable of the Lazy Susan type for supporting different types of foodstuffs which also includes a cooking vessel.

2) Description of the Prior Art

The use of Lazy Susan type of hot plates has long been known. The hot plate is constructed to have a plurality of different compartments with a food to be located within each compartment. A heat source is applied underneath the compartments, and by rotating of the hot plate, the different compartments become conveniently located to a diner. Food from the compartments is to be extracted and placed on a dinner plate located in front of the diner.

Also, in the past, it has been known to construct a turntable type of appliance that is to be located at a dining table that not only maintains food warm but also can be used to cook food. However, in the past, these types of devices have been complex in construction. Also, the type of cooking that can be accomplished is generally limited to a single type of cooking, such as boiling.

SUMMARY OF THE INVENTION

One of the primary objectives of the present invention is to construct a turntable type of appliance that can be located on a dining table that can be used for cooking of food as well as for serving foodstuffs.

Another objective of the present invention is to construct a turntable type of food cooking and service appliance that will permit the appliance to be utilized as a skillet, a wok or other type of cooking bowl.

Another objective of the present invention is to construct a cooking and serving appliance that is attractive in appearance and therefore will encourage the use of the appliance within homes where such similar types of devices in the prior art have not been designed to be attractive in appearance.

Another objective of the present invention is to construct a cooking and service turntable type of appliance that is constructed at a reasonable cost and therefore can be sold to the ultimate consumer at a reasonable cost.

The turntable cooking and serving appliance of the present invention utilizes a substantially planer base which is divided into a plurality of stations, such as four separate stations. However, it is considered to be within the scope of this invention that a greater or lesser number of stations could be utilized. Each station is to be utilized by a separate diner. A pan is centrally mounted on the base with the pan including an electric heating coil. An annular compartment surrounds the pan with there being a ring mounted within the annular compartment. A bearing assembly is located between the ring and the floor of the annular compartment which permits the ring to be freely rotatable relative to the base and the pan. A plurality of trays, all being in the shape of a segment of a circle, are locatable within the annular compartment and are to rest on the ring and to be rotatable therewith. Each tray is adapted to retain a quantity of food. A cooking vessel is located within the pan that permits the food to be cooked on the cooking vessel.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 2 is a transverse cross-sectional view taken along line 2—2 of FIG. 1;

FIG. 3 is a cross-sectional view of a portion of the cooking vessel showing the initiating of a connection with a disengagable handle to facilitate moving of the cooking vessel to and from its location in conjunction with the appliance;

FIG. 4 is a view similar to FIG. 3 but with the handle completely installed with the cooking vessel;

FIG. 5 is a view similar to FIG. 4 but showing the handle in a partially disengaged position from the cooking vessel;

FIG. 6 is an isometric view of the cooking and serving appliance of the present invention showing a skillet type of cooking vessel being utilized in conjunction with the appliance;

FIG. 7 is an isometric view of a bun warmer tray which can be utilized in conjunction with the skillet in FIG. 6;

FIG. 8 is an isometric view of the cooking and serving appliance of the present invention showing a different type of cooking vessel which comprises a bowl that can be divided into two different compartments;

FIG. 9 is an isometric view of a taco holder attachment that can be utilized in conjunction with the base of the cooking and serving appliance of the present invention;

FIG. 10 is an isometric view of a tortilla attachment that could be utilized to keep tortillas warm prior to being used in conjunction with the appliance of FIG. 8;

FIG. 11 is an isometric view of the cooking and serving appliance of the present invention depicting the cooking vessel as a wok;

FIG. 12 is an isometric view of a two-compartment tray that can be utilized in conjunction with the appliance of either FIG. 6, FIG. 8 or FIG. 11; and FIG. 13 is an isometric view of a divider that is to be utilized between directly adjacent pair of trays that will facilitate rotatable movement of the trays within the annular compartment of the appliance.

DETAILED DESCRIPTION OF THE PREFERRED EMBODIMENT

Figure 1:
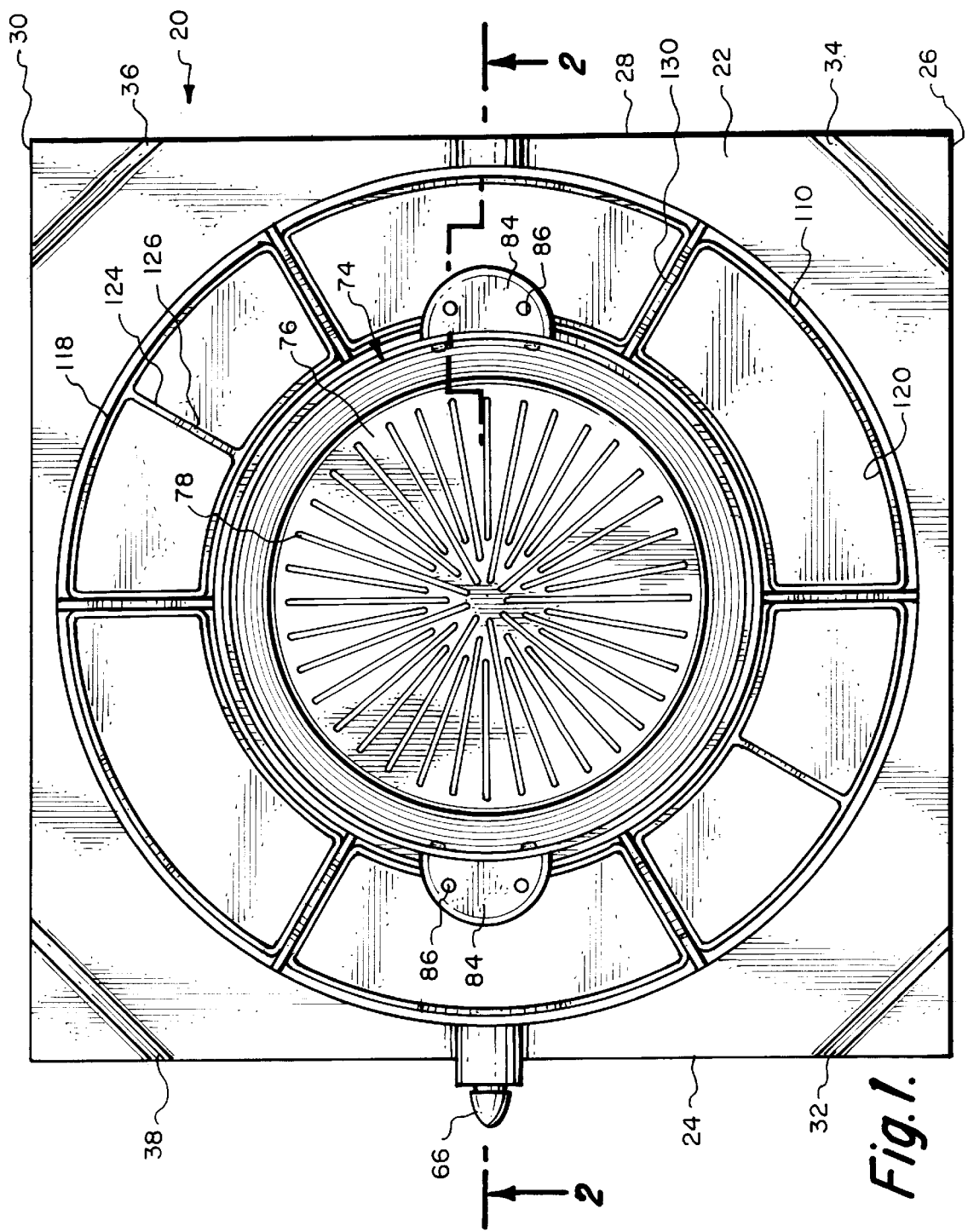
FIG. 1 is a top plan view of the turntable cooking and serving appliance of the present invention.

Referring particularly to the drawings, there is shown the turntable cooking and serving appliance 20 of this invention. The appliance 20 utilizes a substantially planer polygonal shaped base 22. There are four in number of side edges in conjunction with the base 22, side edges 24, 26, 28 and 30. Each side edge 24, 26, 28 and 30 is to function as a station and one particular diner is to be located at each station. Therefore, the appliance shown is adapted to be utilized in conjunction with four people. However, it is considered to be within the scope of this invention that the appliance 20 could be manufactured to accommodate a greater number or lesser number of people if such is deemed to be desired.

The base 22 will normally be constructed of a plastic material. Extending between side edges 24 and 26 is an elongated groove 32. A similar such groove 34 is located between the side edges 26 and 28. A still similar groove 36 is located between the side edges 28 and 30. A still further similar such groove 38 is located between the side edges 24 and 30. Each of the grooves 32, 34, 36 and 38 function as implement supports which are to be connectable with different types of attachments such as a taco holder attachment 40, shown in FIG. 9, or a pair of chopsticks 42, shown in FIG. 11. The taco holder 40 is installed in position by hook member 44 which connects with side edge 24 and hook member 46 which connects with side edge 26 with the body of the taco holder 40 resting within the groove 32. A similar installation is to occur of the taco holder 40 in conjunction with the grooves 34, 36 and 38. The function of the taco holder 40 is so that the taco is supported in a vertical position facilitating the insertion of foodstuffs there within prior to it being consumed. The taco and the foodstuffs are not shown in the drawings. The chopsticks 42 can be merely laid within each of the grooves 32, 34, 36, and 38. It is to be understood that the size of each groove is constructed so as to be sufficiently large to accommodate a pair of the chopsticks 42.

Centrally formed within the base 22 is a central chamber 48. The central chamber 48 is closed at its bottom by a floor cover 50. Foot pads 49 are fixed to the undersurface of the base 24 to form resting surfaces when the appliance 20 is placed on a supporting surface. Fixedly mounted by screw fasteners 52 within the central chamber 48 is a pan 54. Mounted in conjunction with the pan 54 is an electric heating coil 56. A electrical connector 58 connects the coil 56 with this electrical connector being connected by wires 60 and 62 to resistor 64. The resistor 64 can be varied by manually turning of knob 66. The knob 66 can be turned to increase or decrease the amount of heat that is being supplied by the coil 56 to the pan 54.

It is desirable to have the heat, which is produced within the pan 54, to be confined strictly to that pan 54. Therefore, an insulator ring 68 is mounted between the pan 54 and the sidewall 70 of the pan 54. The insulator ring 68 will be circular as the pan 54 is in the shape of a disc. Sidewall 70 will also be circular with the sidewall 70 and the pan 54 defining a pan chamber 72. The insulator ring 68 prevents the heat of the coil 56 from conducting externally of the pan 54.

Referring in particular to FIGS. 1 and 2, a skillet 74 is located within the pan chamber 72. The bottom wall 76 is located against the pan 54 and is adapted to receive the heat from the pan 54. The exterior surface of the bottom wall 76 includes a series of radial ribs 78. Food, such as hamburger patties or the like, are to be placed within the skillet chamber 80 and be resting on the ribs 78. As liquid is removed from the food, it is to collect within the space between the ribs 78 so as to remove grease from the food that is produced during the cooking process.

Mounted in diametrically opposite positions on the sidewall 82 of the skillet 74 are handle attachments 84. Each handle attachment 84 has a pair of spaced apart arcuate holes 86. Each hole 86 is connectable with an arcuate shaped prong 88. There are two in number of the prongs 88 mounted in a spaced apart manner mounted on a handle 90. Handle 90 is elongated and assumes a bifurcated appearance because of the pair of prongs 88 which extend from the front end of the handle 90. With the prongs 88 each caused to engage with a respective hole 86, the handle 90 can then be pivoted from the position shown in FIG. 3 to the position shown in FIG. 4. There is a hook 92 which is slidably mounted within the handle 90. The hook 92 is biased by a coil spring 94 to a forward position which will cause the hook 92 to be located underneath the handle attachment 84. Thereby, the handle 90 is now locked in position on the handle attachment 84 which will permit the skillet 74 to be picked up and placed within the pan chamber 72 or to be removed from the pan chamber 72. This type of handle 90 and handle attachment 84 is also utilized in conjunction with the modified forms of this invention shown in FIGS. 8 and 11.

In referring particularly to FIG. 6, a pair of meat members 96 are shown in phantom lines being located on the ribs 78. Typical meat members would be pork chops, hamburger patties, or the like. There is also shown being supported on the ribs 78 a sausage link 98.

Once the handle 90 is locked in position on the handle attachment 84 and the skillet 74 is located within the pan chamber 72, it is normally desirable to disengage the handle 90 from the handle attachment 84. It is to be understood that the handle 90 could be mounted within any one of the two handle attachments 84. In order to disengage the handle 90 from the handle attachment 84, there is mounted within the upper surface of the handle 90 a slidable button 100. Button 100 is integrally connected to the hook 92. Manual pressure being applied against the button 100 in the direction of arrow 102 will result in the hook member 92 being moved to a disengaged position from the handle attachment 84. This will permit the handle 90 to be pivoted to the position shown in FIG. 3 and then disengaged from the handle attachment 84. Normally, the skillet 74 will be constructed of a metallic material, such as aluminum or iron.

Central chamber 48 is enclosed by an inner annular wall 104. The inner annular wall 104 is basically oriented vertically and is integrally connected to a horizontally oriented floor 106. The floor 106 is integrally connected to an outer annular wall 108. The inner annular wall 104 and the outer annular wall 108 and the floor 106 form an annular compartment 110. Mounted against the floor 106 within the annular compartment 110 is a ball bearing assembly 112. Resting on the ball bearing assembly 112 is a ring 114. Ring 114 includes a short inner annular wall 116. The inner annular wall 116 abuts against the annular wall 104. It is to be understood that the ring 114 is to be readily rotatable relative to the floor 106 by means of the ball bearing assembly 112. Other types of bearing assemblies could be used other than ball bearings.

Locatable on the ring 114 are a series of trays 118. Each tray 118 includes a food receiving compartment 120. The tray 118 is basically arcuate in shape so as to comprise a segment of a circle so it is able to matingly fit within the annular compartment 110. The forward end of the tray 118 may include a raised section 122. The food receiving compartment 120 of the tray 118 may also be divided by partition 124. Partition 124 will normally also include a raised section 126.

Locatable between directly adjacent trays 118 is a divider wall 128. Each divider wall 128 also includes a raised section 130. The raised sections 122, 126 and 128 are to facilitate contact by a human hand and permit rotating of the trays 118 without the hand coming into contact with the food contained within the food receiving compartments 120. Typically, the food that will be located within the food receiving compartment 120 would be food that is designed to accompany whatever is being cooked within the skillet 74. For example, if hamburgers were being cooked, the food receiving compartment 120 may contain relish, mustard, mayonnaise, onions, tomatoes, lettuce, cheese and the like. The hamburger buns can be placed within a warming tray 132, shown in FIG. 7. The warming tray 132 has a handle 134. The user is to grasp the handle 134 and place the warming tray 132 within the skillet chamber 80. The diameter of the warming tray 132 is such that it will be located in a spaced position from ribs 78 and actually assume a snug position at the upper or sidewall 82. The trays 118 are designed to be removable if for any reason a user wishes to remove such from the annular compartment 110. Also, the trays 118 are designed to be removed for cleaning.

Instead of using the skillet 74 in conjunction with the pan 54, the user could utilize a bowl 136, as shown in FIG. 8. The bowl 136 has a bowl chamber 138 which can be divided by a divider 140. Two different types of foodstuffs could be cooked within the bowl chamber 138 which are separated by the divider 140. Typically, the bowl 136 could be used to cook Mexican types of food such as would be commonly found within tacos or tortillas. The tortillas may be maintained in a warm condition by means of a tortilla container 142 which is to be normally covered by a lid 144 with the tortillas to be contained within the container 142 and maintained warm by keeping the lid 144 mounted on the container 142. The exterior surface of the bowl 136 includes an annular skirt 146 which is to function to keep the heat confined within the pan chamber 72. The annular skirt 146 is to rest against the upper edge of the annular wall 104.

Referring particularly to FIG. 11 of the drawings, instead of the skillet 74 or the bowl 136, there may be utilized a wok 148. The wok 148 has an internal wok chamber 150 within which is to be located the food that is to be cooked. The exterior wall of the wok 148 includes an annular skirt 152 which is again to be mounted in the same manner as the annular skirt 146.

The present invention may be embodied in other specific forms without departing from the essential attributes thereof. Reference should be made to the appending claims rather than the foregoing specification as indicating the scope of the invention.

What is claimed is:

1. A turntable cooking and serving appliance comprising:
   a base;
   a pan centrally mounted on said base, said pan including a heating means;
   an annular compartment surrounding said pan and located directly adjacent to said pan, a ring mounted within said annular compartment;
   a bearing assembly located between said ring and said annular compartment, said ring being freely rotatable relative to said base section and said pan;
   a plurality of trays locatable within said annular compartment resting on said ring and rotatable therewith, each said tray adapted to contain food; and
   a cooking vessel locatable within said pan, whereby food is to be cooked within said cooking vessel.

2. The turntable cooking and serving appliance as defined in claim 1 wherein:
   said cooking vessel includes a handle attachment, a handle engagable with said handle attachment, said handle having a pair of spaced apart, outwardly projecting, arcuate prongs and a hook member, said hook member being movable between an engaged position and a disengaged position, said hook member being continuously spring biased toward said engaged position, said handle attachment including a pair of spaced apart holes, each said hole to connect with a said prong with said hook member to lock in conjunction with said handle attachment when in said engaged position thereby securing together said handle and said cooking vessel.

3. The turntable cooking and serving appliance as defined in claim 1 wherein:
   there being a divider wall located between each said directly adjacent pair of said trays, each said divider wall includes a raised section which is located above the level of said trays and said raised section to be contactable by a human hand to facilitate rotation of said trays relative to said base and said pan.

4. The turntable cooking and serving appliance as defined in claim 1 wherein:
   said base including a plurality of implement supports each adapted to support implements such as a pair of chopsticks and a taco holder.

5. The turntable cooking and serving appliance as defined in claim 4 wherein:
   each said implement support comprising an elongated groove.

6. The turntable cooking and serving appliance as defined in claim 1 wherein:
   said cooking vessel comprising a skillet.

7. The turntable cooking and serving appliance as defined in claim 1 wherein:
   said cooking vessel comprising a wok.

8. The turntable cooking and serving appliance as defined in claim 1 wherein:
   said cooking vessel comprising a bowl which includes a removable divider which is used to separate said bowl into two different compartments.

9. A turntable cooking and serving appliance comprising:
   a base;
   a pan centrally mounted on said base, said pan including a heating means;
   an annular compartment surrounding said pan and located directly adjacent to said pan;
   a bearing assembly located within said annular compartment;
   a plurality of trays locatable within said annular compartment, said trays being rotatable by said bearing assembly, each said tray adapted to contain food; and
   a cooking vessel locatable within said pan, whereby food is to be cooked within said cooking vessel.

10. The turntable cooking and serving appliance as defined in claim 9 wherein:
    said cooking vessel includes a handle attachment, a handle engagable with said handle attachment, said handle having a pair of spaced apart, outwardly projecting, arcuate prongs and a hook member, said hook member being movable between an engaged position and a disengaged position, said hook member being continuously spring biased toward said engaged position, said handle attachment including a pair of spaced apart holes, each said hole to connect with a said prong with said hook member to lock in conjunction with said handle attachment when in said engaged position thereby securing together said handle and said cooking vessel.

11. The turntable cooking and serving appliance as defined in claim 9 wherein:
    there being a divider wall located between each said directly adjacent pair of said trays, each said divider wall includes a raised section which is located above the level of said trays and said raised section to be contactable by a human hand to facilitate rotation of said trays relative to said base and said pan.

12. The turntable cooking and serving appliance as defined in claim 9 wherein:
    said base including a plurality of implement supports each adapted to support implements such as a pair of chopsticks and a taco holder.

13. The turntable cooking and serving appliance as defined in claim 12 wherein:

each said implement support comprising an elongated groove.

14. The turntable cooking and serving appliance as defined in claim 9 wherein:

said cooking vessel comprising a skillet.

15. The turntable cooking and serving appliance as defined in claim 9 wherein:

said cooking vessel comprising a wok.

16. The turntable cooking and serving appliance as defined in claim 9 wherein:

said cooking vessel comprising a bowl which includes a removable divider which is used to separate said bowl into two different compartments.

17. The turntable cooking and serving appliance as defined in claim 9 wherein:

said bearing assembly comprising a ball bearing assembly.

* * * * *